United States Patent [19]

Hansen et al.

[11] Patent Number: 5,399,195
[45] Date of Patent: Mar. 21, 1995

[54] FIBRES AND MATERIAL COMPRISING SAME

[75] Inventors: Anders S. Hansen, Oksbøl, Denmark; Derek Davies, Ashbourne, England

[73] Assignee: Danaklon A/S, Varde, Denmark

[21] Appl. No.: 266,787

[22] PCT Filed: Dec. 14, 1989

[86] PCT No.: PCT/DK89/00295

§ 371 Date: Jun. 24, 1991

§ 102(e) Date: Jun. 24, 1991

[87] PCT Pub. No.: WO90/06902

PCT Pub. Date: Jun. 28, 1990

Related U.S. Application Data

[63] Continuation of Ser. No. 996,511, Dec. 21, 1992, abandoned, which is a continuation of Ser. No. 689,078, Jun. 24, 1991, abandoned.

[30] Foreign Application Priority Data

Dec. 14, 1988 [DK] Denmark .............................. 6956/88

[51] Int. Cl.⁶ ............................................. C04B 16/06
[52] U.S. Cl. .................................. 106/711; 106/802; 106/819; 106/823; 428/364; 428/374; 428/113; 524/2; 524/650
[58] Field of Search ............... 106/711, 819, 802, 823; 428/113, 288, 296, 311.5, 312.4, 364, 374; 156/181; 524/2, 650

[56] References Cited

U.S. PATENT DOCUMENTS

| | | |
|---|---|---|
| 3,591,395 | 7/1971 | Zonsveld et al. |
| 4,261,754 | 4/1981 | Krenchel et al. ..................... 106/90 |
| 4,483,727 | 11/1984 | Eickman et al. ..................... 156/181 |

FOREIGN PATENT DOCUMENTS

| | | |
|---|---|---|
| 0006318 | 1/1980 | European Pat. Off. |
| 0026581 | 4/1981 | European Pat. Off. |
| 0047158 | 3/1982 | European Pat. Off. |
| 0081265 | 6/1983 | European Pat. Off. |
| 0087352 | 8/1983 | European Pat. Off. |
| 0152490 | 8/1985 | European Pat. Off. |
| 0212775 | 3/1987 | European Pat. Off. |
| 0225036 | 6/1987 | European Pat. Off. ..... C04B 16/06 |
| 225036 | 6/1987 | European Pat. Off. |
| 0225404 | 6/1987 | European Pat. Off. |

(List continued on next page.)

OTHER PUBLICATIONS

Naaman, "Fiber Reinforcement for Concrete", *Concrete International*, Mar. 1985, with covering letter.
ICI safety data sheet re "Cirrasol N29", Dec. 12, 1988.
ICI data sheet re "Atlas G-2109", Mar. 25, 1988, with covering letter.

(List continued on next page.)

*Primary Examiner*—Mark L. Bell
*Assistant Examiner*—Michael Marcheschi
*Attorney, Agent, or Firm*—Birch, Stewart, Kolasch & Birch

[57] ABSTRACT

A method for producing a cement material with reduced development of self-induced cracking, the method comprising:
adding to a concrete, mortar or cement mix to which water has been added, an amount of 0.05 to 1% by weight, based on the cementitious materials, of synthetic fiber bundles comprising 10-10,000 filaments per bundle, the filaments consisting essentially of a polyolefin, polyolefin derivative, a polyester or a mixture of the foregoing and having a length of 1-30 mm, a mean transverse dimension of 5-30 um and an aspect ratio of 100 to 1000, the filaments in each bundle being held together by a wetting agent, the wetting agent proving the individual filaments with a surface tension which allows them to become homogeneously dispersed in a concrete, mortar or paste mix with conventional mixing in conventional concrete mixing equipment,
mixing the resultant mix for a period of at least 20 seconds to obtain a concrete, mortar or cement mix in which the individual filaments are homogeneously dispersed, and
casting the concrete, mortar or paste mix in a configuration.

43 Claims, No Drawings

FOREIGN PATENT DOCUMENTS

| | | |
|---|---|---|
| 0227452 | 7/1987 | European Pat. Off. . |
| 0235577 | 9/1987 | European Pat. Off. . |
| 235577 | 9/1987 | European Pat. Off. . |
| 0286112 | 10/1988 | European Pat. Off. ..... C04B 16/06 |
| 286112 | 10/1988 | European Pat. Off. . |
| 60-81052 | 5/1985 | Japan . |
| 1537663 | 1/1979 | United Kingdom . |
| 8902879 | 4/1989 | WIPO ........................... C04B 16/06 |

OTHER PUBLICATIONS

Fibermesh Synthetic Fibers Engineered for Concrete and Mortars (date unknown).

Magne Maage, Fracture Energy and Compressive Strength of Concrete containing Fibermesh (date unknown).

Magne Maage, Fracture Energy and Compressive Strength of Concrete containing Fibermesh (revision of preceding article) (date unknown).

USSR Academy of Construction and Architecture, Preparation of Mortars and Concrete Mixtures, Moscow 1960, pp. 163–168 no month.

USSR State Construction Committee, New Equipment for Making and Conveying Concrete Mixtures, Moscow, 1969, pp. 34–40 no month.

Ohgishi Sakichi "Kachaku Kachaku", 1984, 48, No. 12, pp. 905–912 no month.

"Current product list" from Fibermesh (Europe) Ltd. allegedly received by opponent's representative Oct. 1, 1987, together with undated active product list from Simbas Ltd.

"Fibrillated film trials on lab line", memo, Plasticisers Ltd, Oct. 17, 1978.

Memo from Plasticisers Ltd, Oct. 18, 1978.

"Stock list of samples for concrete reinforcement" allegedly held on stock by Plasticisers Ltd, Jul. 24, 1978.

"Charisma II", memo Mar. 5, 1982 from Plasticisers Ltd.

"Production of crimped polypropylene 0.010 inch diameter for hairlock" with note at bottom to the effect that sample needs to be treated with spin finish (date unknown).

Letter from ICI dated Jun. 13, 1986.

Report from Plasticisers Ltd., Dec. 15, 1981.

Goldfein, "Fibrous reinforcement for portland cement", *Modern Plastics*, 1965.

Hannant, *Fibre Cements and Fibre Concretes*, Chapters 7 and 11, 1978 no month.

Forta-Fibre is corrosionproof and may substitute secondary steel reinforcement (date unknown).

Fibermesh, Inc. advertisement (date unknown).

Fibromix advertisement (date unknown).

Fibermesh II Synthetic Fibers for Concrete Reinforcement (date unknown).

FIBRES AND MATERIAL COMPRISING SAME

This application is a continuation of application Ser. No. 07/996,511, filed on Dec. 21, 1992, which is a continuation application of Ser. No. 07/689,078, filed on Jun. 24, 1991, both abandoned.

BACKGROUND OF THE INVENTION

The use of various types of fibres in the production of concrete, to provide additional tensile strength and reinforce against impact damage and crack propagation, has been known and practiced for a long time. It is also known that while conventional reinforcement and coarser fibres can reduce the larger visible cracking which tends to occur in concrete, only very fine fibres are really effective in combating the development of smaller cracks. However, the fibres which are generally used in concrete, for example synthetic fibres of materials such as polypropylene, are relatively coarse, due to the fact that it is difficult to achieve a satisfactory dispersion in concrete of very fine fibres, and particularly fibres with high aspect ratios, using conventional mixing procedures and equipment. In fact, the uniform dispersion of even relatively coarse fibres in concrete can also be difficult.

It is common for such fibres to be produced as an integral fibrillated tape, and to rely on extended mixing to break down the fibrillation and to disperse the individual filaments, which are still relatively coarse, within the concrete. This system may not always be reliable, and the fibrillated tape is not always broken down into the desired individual filaments, especially since the degree of extended mixing required is in practice frequently not achieved. Even when effectively separated, the fibres may still be too coarse to achieve maximum effectiveness for crack inhibition, particularly against micro-cracking.

Concrete is prone to self-induced cracking and, as it is a brittle material, these cracks propagate readily under relatively low stresses. Concrete fails in tension by progressive crack development rather than the more usual failure mode of engineering materials.

It is generally assumed that the discrepancy between concrete's actual and theoretical strength can be explained by the presence of flaws (Neville, A.M., *Properties of Concrete*, 1981). Thus, concrete does not crack because it is weak in tension, but rather it is weak in tension because it already contains cracks. These cracks and flaws vary in size, so that scale is very important when dealing with fracture mechanics, in that the actual strength of the whole is a matter of statistical probability which is dependent upon the crack distribution within the material. The effective strength of the concrete can therefore be increased, and failure, i.e. the development of large-scale cracks or fractures, can be prevented, by inhibiting the development and propagation of cracks.

Self-induced, non-structural cracks occur in large masses of ready-mixed concrete due to small cracks which form early, and these are subsequently propagated by stresses induced by changes in the dimensions of such relatively large structures. Pavement concrete units are typically about 3 m by 10 m by 200 mm thick; small cracks in such concrete can readily propagate, producing a weak link which results in subsequent fracture. This clearly visible cracking is often the only form of cracking which is perceived as being of importance, but it is a direct result of much smaller and probably essentially invisible earlier crack development.

EP-A-0 235 577 discloses agglomerates of fibres having improved dispersability in viscous organic or inorganic matrices, e.g. cement-based matrices, comprising acrylic staple fibres, each fibre having a diameter of less than 50 $\mu$m and length of more than 3 mm, the fibres being bonded to each other by a cohesion-conferring agent which is dissolved in, swells or melts in the matrix to be reinforced. The cohesion-conferring agent, e.g. polyvinyl alcohol, is applied in an amount of 1-30% by weight of the fibre. The fibres preferably have a high elastic modulus.

EP-A-0 225 404 discloses a method of manufacturing a fibre-reinforced moulded cement body, which comprises dispersing strands comprising a plurality of fibres into an unhardened cement material and thereafter hardening the material, at least some of the strands being impregnated with a binder so that the fibres of the strands are weakly bound to one another and so that, when the strands are dispersed in the cement material, the fibres are released from one another. The binder, e.g. an epoxy resin, is used in an amount such that the ratio of the strands to the binder is from 5:5 to 9:1 by volume.

Previous applications of fibre in concrete have been directed towards conventional reinforcement, where sufficient fibres of high elastic modulus are used to bear the tensile stresses. Although this is possible in high cement content materials, this approach may not work effectively with more conventional concretes, even with steel fibres having excellent mechanical characteristics. This can be attributed to the following:

a. The volume of fibre required can be too great to be accommodated in the mortar phase of concrete.
b. The benefit of the fibres may be achieved after the matrix has failed, and can thus in such cases be described as simply being progressive failure rather than usable strength.
c. The cost and difficulties in use do not always justify the application.
d. The three-dimensional orientation of the fibres in premix use and the use of the fibres throughout the material often comprise an inefficient use of reinforcement.

It has become increasingly evident that the most important commercial contribution of the fibres is to improve the characteristics of the concrete itself, rather than to act independently as a reinforcement.

Reinforcement is, however, easy to measure, and although the other benefits, i.e. the strengthening of the concrete itself, may be recognized as being of significance, the difficulty in measuring and quantifying them has been a factor in inhibiting this application of fibre in concrete.

BRIEF DISCLOSURE OF THE INVENTION

It has now been found that it is possible to employ very small quantities of very fine synthetic fibres, for example of polypropylene, to improve the characteristics and performance of concrete and mortars, in particular to prevent the development of cracks induced by dimensional changes occurring within the concrete, and to achieve this crack control at the important micro-level before the cracks develop to become visually evident. The fibres thus serve to improve the intrinsic strength of the concrete, and in particular to prevent self-induced cracks from developing at the micro-level as well as to prevent their propagation, instead of merely providing a separate independent reinforcement.

The fibres are incorporated into the concrete or mortar in the form of fibre bundles which, as will be explained below, allow the desired substantially homogeneous distribution of fine fibres in the material to be achieved. One aspect of the present invention relates therefore to synthetic fibre bundles designed for use in concrete, mortar or cement, the bundles comprising 10–10,000 filaments per bundle, the filaments consisting essentially of a polyolefin such as polypropylene or polyethylene, a polyolefin derivative, a polyester or a mixture of the foregoing and having a length of 1 to 30 mm, a mean transverse dimension of 5 to 30 µm and an aspect ratio of 100 to 1000, the filaments in each bundle being held together by a wetting agent, the wetting agent providing the individual filaments with a surface tension which allows them to become substantially homogeneously dispersed in a concrete, mortar or paste with conventional mixing in conventional concrete mixing equipment.

Another aspect of the invention relates to cement-based materials comprising a small amount of the above fibres. This aspect thus relates to a cement-based concrete, mortar or paste having substantially homogeneously distributed therein synthetic fibres comprising a polyolefin such as polypropylene or polyethylene, a polyolefin derivative, a polyester or a mixture of the foregoing and having a length of 1 to 30 mm, a mean transverse dimension of 5 to 30 µm and an aspect ratio of 100 to 1000, the surface of the fibres comprising a wetting agent, the fibres being present in an amount of less than about 1% by weight of the cementitious materials of the concrete, mortar or paste. The expression "material of the invention", as used in the following, refers to such materials.

In a further aspect, the invention is related to a method of producing the above cement-based material, the method comprising:
adding to a concrete, mortar or cement mix to which water has been added less than 1% by weight, based on the cementitious materials, of synthetic fibre bundles comprising 10–10,000 filaments per bundle, the filaments comprising a polyolefin such as polypropylene or polyethylene, a polyolefin derivative, a polyester or a mixture of the foregoing and having a length of 1 to 30 mm, a mean transverse dimension of 5 to 30 µm and an aspect ratio of 100 to 1000, the filaments in each bundle being held together by a wetting agent, the wetting agent providing the individual filaments with a surface tension which allows them to become substantially homogeneously dispersed in the mix with conventional mixing in conventional concrete mixing equipment,
mixing the resulting mix for a period of at least about 20 seconds to obtain a concrete, mortar or paste mix in which the individual filaments are substantially homogeneously distributed, and
casting the concrete, mortar or paste mix in a desired configuration, optionally with incorporation, during the casting, of additional bodies such as reinforcement.

The invention also relates to a method of producing synthetic fibre bundles for use in concrete, mortar or cement, the bundles comprising 10–10,000 filaments per bundle, the filaments consisting essentially of a polyolefin such as polypropylene or polyethylene, a polyolefin derivative, a polyester or a mixture of the foregoing, the method comprising:
melting the fibre raw material(s) to obtain a melt,
spinning the melt into spun bundles of filaments,
stretching the bundles of filaments,
drying and fixing the bundles of filaments, such that the stretched filaments after fixing have a mean transverse dimension of 5 to 30 µm,
treating the bundles of filaments with a wetting agent so as to hold the filaments of each bundle together and to provide the filaments with a surface tension which allows them to become substantially homogeneously dispersed in a concrete, mortar or paste with conventional mixing in conventional concrete mixing equipment, and
cutting the bundles of filaments to a length of 1 to 30 mm, such that the individual filaments have an aspect ratio of 100 to 1000.

It has been found that because they are initially present in the form of fibre bundles, the very fine fibres described above (in the following referred to as "fibres of the invention") are capable of being effectively dispersed in all types of concrete, mortar or cement using all types of existing conventional mixers, including the rotating drum of a ready-mixed concrete truck. The fibres of the invention can, since they are capable of becoming well dispersed, even at very low addition rates give many important advantages to the characteristics and performance of concrete and other cement-based materials. Among these advantages are:

The inhibition of cracks resulting from plastic shrinkage, plastic settlement, early thermal shrinkage, chemical shrinkage and carbonation.

The inhibition of cracks resulting from drying shrinkage, alternating cyclical stresses due to imposed loads, reversible moisture movements and thermal changes.

The possible elimination of the need for steel mesh to control the worst problems caused by self-induced cracking.

An improvement in durability, due to crack prevention and reduced water absorption, and increased intrinsic strength as a result.

A reduction in frost damage, due to reduced permeability and an increased resistance to spalling as a result of increased concrete strength and integrity and increased resistance to crack propagation.

Increased resistance to impact and abrasive damage.

Greater cohesion of the wet concrete and the imparting of a thixotropic rheology, resulting in:
more homogeneous and consistent concrete, with more uniform and reliable characteristics,
easier pumping, placing and finishing, and the prevention of sedimentation and excessive bleeding,
a reduced tendency for the formation of plastic settlement cracks, as a result of the reduction in sedimentation, and
benefits when placing the concrete on slopes, as the material has less tendency to continue movement, which otherwise results in increased tendency to cracking.

Better resistance to fire damage, since the fine synthetic fibres melt at high temperatures, thus allowing the superheated steam generated within the concrete a large number of capillaries by which to escape.

Better resistance to deterioration by corrosive chemicals, due to reduced penetration of such chemicals into the concrete.

A more consistent and homogeneous concrete by increasing mixer efficiency and preventing particle size segregation and subsequent sedimentation.

The cohesiveness provided by the fibres of the invention serves to improve the finishing of the concrete. Texturing of the surface, to produce a non-slip finish, is improved, and the achieved effect is not reduced by subsequent settlement, due to the thixotropic characteristic provided by the fibres.

The fibres do not impair the surface finish of the concrete and are, themselves, effectively invisible in the concrete to the naked eye. The thixotropic effect may also be of interest in enabling new and more interesting aesthetic finishes and effects to be achieved, including decorative in situ and pre-cast applications.

It is increasingly common to employ higher cement contents in concrete and other cement-based materials, in order to increase their durability. This leads, however, to a greater tendency to self-induced cracking, and, because these materials are relatively brittle, to greater crack propagation. As mentioned above, the fibres of the invention are capable of being effectively dispersed in all types of concrete or mortar. The fibres, due to their ability to prevent cracking, thus allow concrete or other cement-based materials to be improved both directly and indirectly in relation to durability requirements.

The use of pozzolanic materials is also increasing, and when these materials are very fine, such as micro-silica, they can reduce the rate of bleeding and water migration and may lead to increasing plastic cracking.

When less fine pozzolanic materials, such as pulverized fuel ash, are employed, the rate of strength increase is reduced and the period during which the concrete or other cement-based material is weak and vulnerable to plastic or early shrinkage cracking is increased. The use of ground granulated blast furnace slag cement has a similar effect on early strength development. Also, when polymer emulsions are added to concrete or cement-based materials, the vulnerability to early drying cracks is known to increase.

In all of these cases, the addition of small quantities of the very fine fibres of the invention is effective in reducing the tendency of the material to crack, and thus enables the potential of these materials be achieved to a higher degree.

High alumina cements suffer from high exothermic temperature rises, which also lead to cracking problems and limit the effectiveness of these materials. The fibres of the invention are effective in controlling such cracks and increasing the performance of these cements.

Cements which can be designed with long-term controlled expansion to offset the long-term drying shrinkage, such as calcium sulfo-aluminates, nevertheless suffer from plastic and early drying shrinkage. The fibres of the invention are therefore also of interest in allowing these cements to retain integrity for a sufficient time to allow the long-term shrinkage-compensating benefits of these cements to be achieved.

DETAILED DESCRIPTION OF THE INVENTION

The fibres of the invention are incorporated into a concrete or other cement-based material in the form of the above-mentioned fibre bundles, which may consist essentially of a polyolefin, a polyolefin derivative, a polyester a polyamide or a mixture of the foregoing. Typically, the fibres will consist of a polyolefin such as polypropylene or polyethylene. Polypropylene is a well-known material for synthetic fibres, and has been used as such for many years, owing to its resistance towards acids and bases, its advantageous strength properties, its low density and its low price.

While there always will be a certain variation in the number of filaments in the fibre bundles, they will typically comprise about 50 to about 5000 filaments per bundle, such as about 100 to about 2000 filaments per bundle, in particular about 500 to about 1500 filaments per bundle, such as about 1000 filaments per bundle.

As opposed to fine fibres which for example are used in the preparation of yarn for carpets, the fibres of the invention are preferably substantially non-crimped, in order to facilitate dispersion in a concrete or other cement-based material.

The individual filaments typically have a length of about 3–30 mm, e.g. about 5–25 mm, in particular about 6–18 mm, and a mean transverse dimension of about 3–30 $\mu$m, such as about 5–25 $\mu$m, in particular about 10–20 $\mu$m.

The aspect ratio, i.e. the ratio between length and diameter, of the individual filaments is typically about 200–800, in particular about 400–700, such as about 600. While an aspect ratio of at least about 100 is considered to be the minimum desirable to achieve effectiveness from the use of fibres in concrete or cement-based materials, it has previously proved difficult to achieve good dispersion even of fibres with lower aspect ratios. Furthermore, to disperse fibres of aspect ratios of only 100 has often required special mixing facilities and the use of special additives within the mix to assist with dispersion. The individual filaments according to the invention thus have a high aspect ratio compared to fibres generally used in concrete, and are advantageous as such. Nevertheless, the fibres according to the present invention, in the form of fibre bundles, can be readily dispersed in concrete even when the individual filaments have an aspect ratio of about 1000.

The fact that the fibres of the invention are capable of being dispersed easily in a cement mix using ordinary mixing times, procedures and equipment is believed to be due 1) the dispersibility of the units constituted by the fibre bundles in a cement mix to which water has been added, and 2) the ready separation of the bundles into "subbundles" and individual filaments upon mixing or agitation. The individual filaments have a surface tension which allows them to become substantially homogeneously dispersed in a concrete, mortar or paste with conventional mixing in conventional concrete mixing equipment. The surface of the filaments will thus be substantially hydrophilic, so that the filaments will be easily dispersible in water or mixtures containing water, e.g. a concrete, mortar or cement mix to which water has been added. A suitable surface tension for the filaments is about 65–80 dynes/cm$^2$, such as about 70–75 dynes/cm$^2$, in particular about 72–74 dynes/cm$^2$.

The desired surface tension is typically achieved by treating the bundles of filaments with a wetting agent. As an additional surface treatment, the bundles of fibres may optionally be subjected to an electrical treatment known as a corona treatment. These procedures will be explained in greater detail below.

The above-described fibres are typically produced as follows:

The first step in the production of the fibre bundles is the melting the fibre raw material(s). This often takes place in an extruder, although an extruder does not necessarily have to be employed. The temperature employed for the melting of the constituent(s) of the fibres will obviously depend on the materials employed in the given fibre.

The type of spinning equipment used in the spinning of the melt into a spun bundle of filaments is not critical, as both "short spinning" and "long spinning" may be employed. Short spinning is a one-step process, in which the bundles of fibres are both spun and stretched in a single operation, while long spinning, or conventional melt spinning, as it also is known, is a two-step process, in which the first step is the extrusion of the melt and the actual spinning of the bundles of fibres, while the second step is the stretching of the spun fibres.

The spun fibres are cooled as they are drawn out of the spinnerette, the cooling typically being achieved by a stream of air which is blown past the fibres.

The bundles of filaments, which at this point typically comprise several thousand fibres, are subsequently stretched. Stretching is typically accomplished using a series of hot rollers and a hot air oven or a liquid medium such as hot water or oil, a number of bundles of filaments typically being stretched simultaneously. The bundles of filaments pass first through one set of rollers, followed by passage through the hot air oven or the hot liquid, and then pass through a second set of rollers. The hot rollers typically have a temperature of about 70°–130° C., and the hot air oven or hot liquid typically has a temperature of about 80°–140° C. The speed of the second set of rollers is faster than the speed of the first set, and the heated bundles of filaments are therefore stretched according to the ratio between the two speeds (called the stretch ratio or draw ratio). A second oven or liquid and a third set of rollers can also be used (two-stage stretching), with the third set of rollers having a higher speed than the second set. In this case the stretch ratio is the ratio between the speed of the last and the first set of rollers. Similarly, additional sets of rollers and ovens or liquids may be used.

The fibres of the present invention are typically stretched using a stretch ratio of about 1.5:1–8:1, normally about 2:1–6:1, preferably about 2.5:1–4:1, in particular about 2.5:1–3.5:1, resulting in the appropriate diameter or mean transverse dimension as explained above.

The bundles of filaments are then dried and fixed. The stretching process may cause tensions to develop in the fibres. These may be relaxed by subjecting the stretched bundles of filaments to heating, which also serves to dry the fibres. Conveniently, this is done by passing the bundles of filaments through an oven in which the fibres are allowed to shrink.

An mentioned above, the bundles of filaments are subsequently treated with a wetting agent so as to provide the filaments with the desired surface tension, i.e. a surface tension of about 65–80 dynes/cm$^2$, such as about 70–75 dynes/cm$^2$, in particular about 72–74 dynes/cm$^2$. This is typically accomplished by passing the bundles through a series of so-called lubricant application rollers to which the wetting agent is supplied. In addition to providing for easy dispersion of the individual filaments in a cement mix, the wetting agent also serves to hold the filaments of the bundle together during light handling prior to the addition of the fibre bundles to the mix. The wetting agent is typically chosen from wetting agents of the kinds normally used for application to synthetic fibres which are to be made hydrophilic, such as wetting agents for application to fibres to be used in the so-called wet-laid non-woven processes. Such wetting agents are commercially available and are typically compositions comprising compounds normally used as emulsifiers, surfactants or detergents, and may comprise blends of these compounds. Examples of such compounds are fatty acid esters of glycerides, fatty acid amides, polyglycol esters, polyethoxylated amides, non-ionic surfactants and cationic surfactants.

Specific examples of compounds which may be used as wetting agents or constituents of wetting agents are a polyethylene glycol-lauryl ether having the formula:

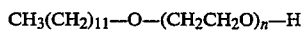
$$CH_3(CH_2)_{11}-O-(CH_2CH_2O)_n-H$$

glycerol monostearate, which has the formula:

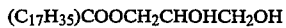
$$(C_{17}H_{35})COOCH_2CHOHCH_2OH$$

erucamide, which has the formula:

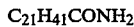
$$C_{21}H_{41}CONH_2$$

stearic acid amide, which has the formula:

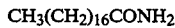
$$CH_3(CH_2)_{16}CONH_2$$

a trialkyl-phosphate having the formula:

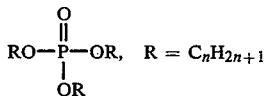
$$RO-\underset{\underset{OR}{|}}{\overset{\overset{O}{\|}}{P}}-OR, \quad R = C_nH_{2n+1}$$

a lauryl-phosphate-amine ester having the formula:

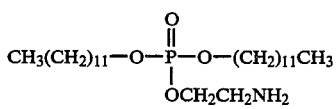
$$CH_3(CH_2)_{11}-O-\underset{\underset{OCH_2CH_2NH_2}{|}}{\overset{\overset{O}{\|}}{P}}-O-(CH_2)_{11}CH_3$$

a lauryl phosphate-potassium salt having the formula:

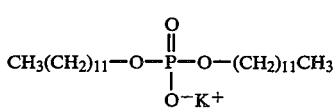
$$CH_3(CH_2)_{11}-O-\underset{\underset{O^-K^+}{|}}{\overset{\overset{O}{\|}}{P}}-O-(CH_2)_{11}CH_3$$

or:

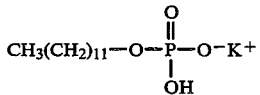
$$CH_3(CH_2)_{11}-O-\underset{\underset{OH}{|}}{\overset{\overset{O}{\|}}{P}}-O^-K^+$$

and an ethylenediamine-polyethylene glycol having the formula:

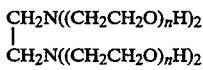
$$\begin{array}{l} CH_2N((CH_2CH_2O)_nH)_2 \\ | \\ CH_2N((CH_2CH_2O)_nH)_2 \end{array}$$

An example of a preferred wetting agent is SW-T which is available from Nissin Kagaku Kenkyosho Ltd., Japan, and which comprises a major proportion of sulfosuccinic acid bis (2-ethylhexyl)ester sodium salt (an anionic wetting/dispersing compound) and also contains isopropyl alcohol, siloxans, silicones, silica, and sorbitan monostearate.

The bundles of fibres may, in addition to being treated with a wetting agent, optionally be subjected to a corona treatment, which is an electrical treatment which is widely used in the production of synthetic fibres. This treatment is a vigorous electrical discharge from a special electrode to the fibre bundles. A rather high voltage is required (about 25 kV and 20 kHz) in order for the electrons to obtain sufficient energy to penetrate the surface of the fibres. When the electrons hit the polymer chains at a high speed, many of these chains will be broken, thus providing the possibility of forming carbonyl groups by means of ozone ($O_3$) in the air. The formation of carbonyl groups makes the surface of the fibres polar and thus more easily dispersible in aqueous mixtures. The optional corona treatment is normally performed before the application of the wetting agent.

After being treated with the wetting agent, the bundles of filaments become spontaneously divided into smaller bundles, each of which comprises fewer filaments than the original bundles. Thus, the bundles of filaments will then typically comprise about 50 to about 5000 filaments per bundle, such as about 100 to about 2000 filaments per bundle, in particular about 500 to about 1500 filaments per bundle, such as about 1000 filaments per bundle. It must be kept in mind that there will always be a certain natural variation in the number of filaments per bundle.

The bundles of filaments are then led to a cutter, where the fibres are cut to the desired length. Cutting is typically accomplished by passing the bundles over a wheel containing radially placed knives. The fibres are pressed against the knives by pressure from rollers, and are thus cut to the desired length, which is equal to the distance between the knives. As explained above, the bundles of filaments are cut so that the fibres have a length of about 1–30 mm, typically about 3–30 mm, e.g. about 5–25 mm and in particular about 6–18 mm, thus providing them with an aspect ratio as explained above.

The bundles of filaments produced by the above process are, as explained above, designed for use in concrete, mortar or cement, and the individual filaments of the bundles are capable of being effectively dispersed in all types of concrete, mortar or cement using all types of existing conventional mixers. Accordingly, the invention also relates to, as mentioned above, a cement-based concrete, mortar or paste having substantially homogeneously distributed therein the above-described synthetic fibres, the fibres being present in an amount of less than about 1% by weight of the cementitious materials of the concrete, mortar or paste.

In the present context, the term "cement" is intended to designate all cements of the Portland cement type, including white Portland cement, low-alkali cements, sulphate-resistant cements, Portland slag cement and Portland pozzolana cement, and cements of the refractory or aluminate type such as high alumina cement and calcium sulfoaluminate cements, blast furnace cements, pozzolanic cements, gypsum including hemi and anhydrite versions, magnesium oxychlorate and magnesium chloride and other similar non-organic cement systems, both hydraulic and non-hydraulic, or combinations of the above, optionally with additives or polymer additions. A "paste" refers to a mixture of cement and water.

The term "mortar" as used in the present context refers to a mixture comprising cement and particles such as sand and fine rock or stone, including special lightweight aggregate materials, the particles being able to pass through a sieve or screen having an opening of 2.4 mm. The term "concrete" as used in the following refers to a mortar or paste comprising larger aggregates. The term "cementitious materials" refers to the content of the above-mentioned cement materials in a concrete, mortar or paste.

It will be clear to a person skilled in the art that the term "substantially homogeneously distributed therein" refers to the fact that the fibres of the invention are substantially homogeneously distributed within the mortar phase of the material of the invention, since such fibres clearly cannot be distributed within the larger aggregates in a concrete.

Concrete or other cement-based materials can be regarded as being either in situ or pre-cast, in situ materials being cast on-site. In situ concrete is generally of the ready-mixed type, although it may also be mixed on-site.

A mortar or concrete comprising the fibres of the invention will generally have a cement content in the range of about 200–1200 kg/m$^3$. A conventional in situ concrete, in which the fibres of the invention often will be incorporated, typically has a cement content of about 200–600 kg/m$^3$, in particular about 250–450 kg/m$^3$, while a pre-cast concrete employing the fibres of the invention will typically have a cement content of about 300–500 kg/m$^3$. A mortar will typically have a cement content of about 400–1200 kg/m$^3$, in particular about 600–1000 kg/m$^3$. Special high-strength concretes or mortars may have a cement content of about 500–1200 kg/m$^3$, typically about 500–1000 kg/m$^3$.

The water:cement ratio of a cement-based material according to the invention will typically be in the range of about 0.25–0.8 by weight. In situ concrete will typically have a water:cement ratio of about 0.4–0.6, while the water:cement ratio in pre-cast concrete will typically be about 0.25–0.35 when compacted by pressure and about 0.4–0.6 when wet cast and vibration compacted. However, the incorporation of the fibres of the invention into cement-based materials having a water:cement ratio lower than 0.25, e.g. dense materials containing ultrafine micro-silica, is also of interest.

A concrete according to the invention will typically contain a mortar phase of at least about 0.2 by weight. The proportion of the mortar phase in a conventional concrete is generally limited to a maximum of about 0.6, due to the fact that the concrete's tendency to crack increases with increasing amounts of mortar. However, since the incorporation of the fibres of the invention into concrete leads to a reduced tendency to cracking, it is possible to produce concretes with a larger mortar phase than that which is normally employed, without the danger of excessive cracking. Thus, a concrete according to the invention may comprise a relatively large mortar phase, such as up to about 0.8 or even greater.

The fibres of the invention are typically present in the material in an amount of about 0.05–0.5%, in particular about 0.1–0.3%, such as 0.15–0.25%, by weight of the cementitious materials.

For a typical in situ concrete having a cement content of about 250–400 kg/m$^3$, the content of fibres of the invention will thus be less than about 4 kg/m$^3$, typically about 0.1–2.0 kg/m$^3$, such as about 0.3–1.0 kg/m$^3$, in particular about 0.4–0.8 kg/m$^3$, e.g. about 0.5–0.7 kg/m$^3$.

A concrete or mortar according to the invention may contain additives to reduce water requirement, increase workability, change rheology, reduce permeability, entrain air or retard or accelerate the cement reaction with water. It may also contain various types of organic polymers introduced as solids or water-based emulsions, including polymer-impregnated concrete or polymer cement concrete. In addition, it may contain reinforcement, included either as bars or meshes, including ferrous cement and metal lathing, or as additional fibres of e.g. metal, glass or synthetic material.

As explained above, it has been found that the incorporation of even very small quantities of the fibres of the invention provides the cement-based material in question with various advantages. That such benefits can be obtained with such small quantities of fibres can be explained by the fineness of the fibres, together with the fact that they are able to become substantially homogeneously dispersed in the material. Fibre bundles of the invention having, for example, $300 \times 10^6$ individual 12 mm long filaments per kg will provide, when incorporated into a cement-based material at a rate of, for example, 0.6 kg of fibre bundles per $m^3$, about 2000 km of fibre per $m^3$. Seen in this light, it is clear that even small quantities of the fibres of the invention can provide significant benefits when incorporated into a cement-based material.

The cement-based material of the invention can, as explained above, be produced by adding to a concrete, mortar or cement mix to which water has been added less than 1% by weight, based on the cementitious materials, of the fibre bundles according to the invention, mixing the resulting mix for a period of at least about 20 seconds to obtain a concrete, mortar or paste mix in which the individual filaments are substantially homogeneously distributed, and casting the concrete, mortar or paste mix in a desired configuration, optionally with incorporation, during the casting, of additional bodies such as reinforcement. The fibre bundles are typically added in an amount of about 0.05–0.5%, in particular about 0.1–0.3%, such as about 0.15–0.25%, by weight of the cementitious materials.

As the individual filaments of the fibre bundles are readily dispersed in all types of concrete and cement-based materials, the mixing period is dictated by the need to produce good concrete, rather than to disperse the fibres. The bundles of fibres according to the invention can be used in all forms of mixers, including rotating drum and paddle mixers and in particular ready-mixed concrete truck mixers, and require no special mixing arrangements or equipment. In cases where a pre-cast concrete, mortar or cement mix to which the fibre bundles have been added are mixed in a paddle mixer (also known as a forced action mixer), mixing is carried out for a period of at least about 20 seconds, typically at least about 30 seconds, to obtain a concrete, mortar or paste mix in which the individual filaments are substantially homogeneously distributed. In cases where an in situ concrete, mortar or cement mix to which the fibre bundles have been added are mixed in a drum mixer (also known as a tumble mixer), mixing is typically carried out for a period of at least about 2 minutes, to obtain a concrete, mortar or paste mix in which the individual filaments are substantially homogeneously distributed.

The bundles of fibres of the invention will often be added to a concrete mix in a truck mixer, the truck mixer being an arrangement consisting of a spiral inside of an inclined drum. When the drum rotates, the material being mixed simply falls to the bottom of the spiral, and that constitutes the mixing action. The fibre bundles can also be added to already mixed concrete, and good dispersion can be achieved with the ready-mix drum rotating at, for example, 15 rpm for a period of, for example, 3 minutes.

A truck mixer can be designed either for mixing or for agitation only. In some systems concrete is mixed and put in the drum of a truck mixer, so that the truck is merely used to agitate the already mixed concrete, while in other systems the materials of the concrete are put in the drum of the truck mixer, and the truck mixer actually mixes the materials.

It is possible to mix the fibre bundles into the dry constituents of a cement or concrete mix, e.g. in pre-blended dry mixed materials requiring only the addition of water, but at present, this is neither preferred nor considered necessary, as it is believed to be at least as advantageous to add the fibre bundles to a wet mixture or a mixture to which water already has been added, due to the substantially hydrophilic surface properties of the fibres.

The mixed concrete, mortar or paste comprising the fibres of the invention substantially homogeneously dispersed therein can be cast in a conventional manner in a desired configuration. The material may thus be compacted and shaped either by simple placing or gravity, or by trowelling, floating, tamping, vibration, pressing, water extraction, vacuum, extrusion, pumping, spraying, dry placing, spinning, rolling or a combination of these processes. Additional bodies, such as reinforcement, can, if desired or necessary, be incorporated into the material during casting.

Materials prepared according to the invention are envisaged as being of particular importance in all types of mass on-site concrete, such as for pavements, foundations, roadways, floors, bridge decks, concrete buildings, structural concrete, retaining walls, water retaining structures and for sea defence and military purposes, as well as in pre-cast concrete, such as for cladding panels, floors, joists and beams, ornamental and architectural products, prefabricated structures, pipes, tunnel linings, etc.

The invention will be further illustrated by the following non limiting examples.

EXAMPLE 1

Preparation of fibre bundles

The preparation of the fibre bundles comprised the following steps:

melting the fibre raw material to obtain a melt,
spinning the melt into a spun bundle of filaments,
stretching the bundle of filaments,
drying and fixing the bundle of filaments,
treating the bundle of filaments with a wetting agent, and
cutting the bundles of filaments.

The fibres consisted of a homopolymer isotactic polypropylene (Petrofina 10060 from Petrofina, Belgium) having a melting point of about 160° C. and a melt flow index of 35. The polypropylene was melted, and subsequently spun at a temperature of about 280° C., using a spinnerette having 22,880 holes, and with a drawing speed of 22.5 m/min. The spun bundle of filaments was then passed through a hot water bath having a temperature of 100° C. and subsequently stretched at a speed of 60.7 m/min., giving a stretch ratio of 2.7. Drying and fixing of the bundle of filaments was accomplished by passing the bundle through an oven having a temperature of 150° C. at a speed of 54.2 m/min., thus allowing the fibres to shrink by about 12% and the tensions from the stretching of the fibres to be released. The fibres were provided with the desired surface tension by treating the bundle with a wetting agent (SW-T, Nissin Kagaku Kenkyosho Ltd., Japan, vide above) by passage through a pair of lick rollers. Finally, the bundles of fibres were cut to a length of 12 mm.

The finished fibres, comprising roughly 1000 individual filaments per bundle, had a moisture content of less than 17% and contained about 0.5% wetting agent. The individual filaments had a fineness of 2.8 dtex, which is the equivalent of a diameter of about 20 $\mu$m, giving the fibres an aspect ratio of about 600.

EXAMPLE 2

Preparation of concrete beams

Concrete beams were prepared from a factory pre-blended concrete mix consisting of rapid-hardening Portland cement, standard coarse concreting sand and a gravel aggregate passing a 20 mm sieve, in a ratio of 2:3:6, the mix having a cement content of 400 kg cement/m$^3$. The concrete mix was mixed with water having a temperature of 20° C., as well as the fibre bundles of Example 1. The water:cement ratio was 0.6, and the fibre bundles were added in an amount of 0.2% by weight of the cementitious materials. The concrete was mixed in a rotating drum mixer with a capacity of about 100 l, using a speed of about 25 rpm and a total mixing time of 4 minutes, the fibre bundles being added after the first 2 minutes of mixing. The individual filaments were substantially homogeneously distributed in the mix at the end of the mixing period. Concrete beams of 150 mm square and 550 mm long were prepared by placing the mix into a multi-compartment mold and compacting by hand.

For purposes of comparison, beams were prepared as above, but without the incorporation of the fibres. Beams with and without fibres were cast alternately in the multi-compartment mold.

EXAMPLE 3

Bending tests

Laboratory tests were carried out on concrete beams prepared as in Example 2, containing either 0.2% fibres by weight of the cementitious materials or without fibres. The beams were subjected to early drying, and subsequently subjected to a standard 4-point flexural bending test, with outer rollers spaced at 450 mm and inner rollers spaced at 150 mm.

The results of these tests are summarized below:

| Fibres | Modulus of rupture |
|---|---|
| without fibres | 2.83 MPa |
| without fibres | 2.31 MPa |
| 0.2% fibres | 3.17 MPa |
| 0.2% fibres | 3.22 MPa |

It is seen that the modulus of rupture is considerably higher for the beams which contain the fibres of Example 1. The modulus of rupture was also more consistent in beams containing the fibres.

EXAMPLE 4

Cyclical loading tests

Concrete beams were prepared as in Example 2 and subjected to a 4-point flexural bending test as in Example 3, with the following exceptions: 1) the beams were not subjected to early drying, and 2) the load was kept below the modulus of rupture and was repeatedly applied at 2000 cycles/hour. The load was increased after 4000 cycles in order to reduce the period of the test. The results are summarized below:

| Fibre | Maximum modulus of rupture | No. of cycles at load of | | | | |
|---|---|---|---|---|---|---|
| | | 15 kn | 16 kn | 17 kn | 18 kn | 19 kn |
| without | 2.13 MPa | 1540 | 425 | | | |
| without | 2.27 MPa | | 4160 | 17 | | |
| with | 2.40 MPa | | 4000 | 4000 | 925 | |
| with | 2.53 MPa | | 4000 | 4000 | 4000 | 1875 |

The tests indicated a distinct improvement in both stress levels and fatigue resistance in beams containing the fibres. The combination of both the increased stress levels and the numbers of cycles before failure with the fibre-containing concrete indicates considerably improved fatigue resistance.

EXAMPLE 5

Preparation of in situ concrete containing the fibres of the invention

The fibre bundles of Example 1 have been incorporated in an amount of 0.2% by weight of the cementitious materials into various types of concrete, including in situ concrete, using conventional unmodified mixing equipment, and without the need for additional additives, as follows:
  a) A 30 MPa concrete, with 300 kg of cement per cubic meter and a 20 mm aggregate, with a water cement ratio of 0.56 and a 50 mm slump.
  b) A 30 MPa concrete, as in a) above but with 320 kg of cement per cubic metre and a water;cement ratio of 0.52, and including an air-entraining agent.
  c) A 30 MPa concrete, as in a) above but with 210 kg of ordinary Portland cement and 105 kg of pulverized fuel ash per cubic metre.
  d) A 30 MPa concrete, with 350 kg of cement per cubic metre and roughly equal proportions of a 10 mm aggregate and sand, with a water:cement ratio of 0.58 and a 100 mm slump.
  e) A 40 MPa concrete, with 400 kg of cement per cubic metre and a 10 mm aggregate, with a water:cement ratio of 0.50 and a 100 mm slump.

All of the above concretes were mixed in conventional truck mixers manufactured by Mulder and Stothert & Pitt and containing 6 m$^3$ concrete. In all cases complete dispersion of the fibres was achieved within 3 minutes with the drum rotating at 15 rpm. This complete dispersion was achieved even when the fibres were added to the already mixed concrete by simply introducing the fibres into the back of the truck mixer on site.

EXAMPLE 6

Preparation of pre-cast concrete containing the fibres of the invention

The following pre-cast concrete materials containing the fibres of the invention, incorporated as the fibre bundles of Example 1, in an amount of 0.2% by weight of the cementitious materials, were prepared:
  a) A 40 MPa concrete containing 400 kg of cement per cubic metre and roughly equal proportions of 5 mm gravel and sand, with a water:cement ratio of 0.31.

b) A 40 MPa concrete containing 350 kg of cement per cubic metre and roughly equal proportions of 10 mm gravel and sand, with a water:cement ratio of 0.30.

Full dispersion of the fibres was achieved in both cases in under 1 minute in a forced action paddle mixer (Teka and Liner Cumflow). The concrete compacted well in both cases, and the products exhibited no adverse surface effects.

EXAMPLE 7

Concrete pavement containing the fibre of the invention

A 30 MPa concrete containing about 300 kg of cement per cubic meter and a 20 mm aggregate, with a water:cement ratio of 0.55, and containing 0.2%, by weight of the cementitious materials, of fibres according to the invention incorporated as the fibre bundles of Example 1, was prepared. 200 mm thick in situ concrete pavement areas were placed externally in strips 2.5 m wide and in continuous lengths of 50 m, with no shrinkage control joints. No cracking was evident after 2 months, and thus it is not anticipated that cracking will occur.

Similar trials, which gave similar results, had been undertaken 9 months earlier with continuous strips having a length of 20 m.

EXAMPLE 8

Practical experience with concrete prepared with the fibres of the invention a) A 200 mm thick concrete roadway with a width of approximately 5 meters and a length of just over 80 meters with a gradient of about 1 in 15 was laid using 0.7 kg of the fibres of Example 1 pr. m$^3$ concrete. The concrete was 30 MPa, air entrained, with a total cementitious content of 330 kg/m$^3$ including 25% of furnace blast slag.

The 80 meters was laid in one day in a continuous strip formed from the top of the incline to the base. No shrinkage control Joints were formed. The top of the concrete was thickened so that it was effectively anchored and the end of the roadway was stopped short of the adjoining concrete at the base, this being filled in later.

After some weeks a single fracture occurred across the road at approximately the mid-point and in line with a joint in adjoining concrete. After being in use for nearly a year by a continuous stream of heavy lorries, dump trucks, etc., no deterioration or further cracking has appeared. The central crack has not opened, nor has any differential vertical movement on either side of the crack occurred, the crack in fact being visible only by careful examination.

This and other applications indicate that the preparation of continuous strips of up to about 50 linear meters without shrinkage control joints seems perfectly feasible with the fibres of the invention and without any steel reinforcement.

b) The fibres of the invention were used in a factory floor of laser screed concrete.

The concrete was laid in two pours, each in one day, the first pour being of 2300 m$^2$ and the second pour of 3200 m$^2$, the concrete being a standard 30 MPa concrete with 330 kg/m$^3$ of ordinary Portland cement. The concrete contained the fibres of Example 1 in an amount of 0.6 kg/m$^3$. The surface was power floated and was treated on the following day with sodium silicate as a surface hardener. The concrete was laid at a 150 mm thickness onto a polyethylene vapour barrier.

Two days after laying, the concrete was sawn at stanchion spacing or roughly every 7 meters to a depth of approximately 50 mm, to form long-term shrinkage control joints.

After several months, a number of the sawn control joints had opened, but no cracking of the concrete had otherwise taken place.

Because of the very cold weather following the laying of the concrete, the factory radiant gas heaters were left on for 48 hours, but despite this, no shrinkage cracks occurred.

c) Over 4 tons of the fibres of the invention have been used in sea defence work to protect large areas of low lying land in Lincolnshire, England from being flooded by the North Sea. Two grades of concrete have been used, a 30 MPa and a 40 MPa, both of which had high cement substitutions to control the alkali content.

Serious plastic cracking has always been experienced in sea defence concrete because of the very windy and exposed conditions. It was found that the addition of 0.9 kg of the fibres of Example 1 led to a dramatically reduced incidence of cracking, and the overall results obtained have proved very satisfactory.

d) Approximately 100,000 m$^2$ of ground floor car park concrete containing the fibres of the invention was laid at a shopping development.

150 mm thick concrete slabs were prepared with incorporation of bottom steel mesh, but without incorporation of top steel mesh, the concrete instead being prepared with 0.9 kg of the fibre bundles of Example 1 pr. cubic metre. The concrete was a 30 MPa concrete, 330 kg/m$^2$, air entrained with a 25% slag cement replacement.

The preparation of such large concrete slabs, which had a size of 8×16 meters, would normally be extremely difficult, since the use of the bottom steel mesh restrains overall slab shrinkage and consequently induces greater shrinkage stresses in the concrete. However, no cracking was exhibited in the concrete slabs containing the fibres of the invention, and the overall results obtained have been excellent.

e) A factory floor of over 6000 m$^2$ with a general thickness of 150 mm was laid using conventional strip laying with sawn shrinkage control joints.

The concrete was a high-strength concrete containing micro-silica and with a cement content of 350 kg/m$^2$, and was prepared using a standard superplasticizer to reduce the water/cement ratio to below 0.5. The fibres of Example 1 were used in an amount of 0.6 kg/m$^3$.

It was found that the cube strengths actually achieved were consistently higher than anticipated. The results have proved excellent and indicate that the combination of high-strength concrete, which is generally recognized as being more prone to cracking, with the crack-inhibiting effect of the fibres is an excellent combination.

We claim:

1. A method for producing a cement material with reduced development of self-induced cracking, the method comprising:
    adding to a concrete, mortar or cement mix to which water has been added, an amount of 0.05 to 1% by weight, based on the cementitious materials, of synthetic fibre bundles comprising 10–10,000 filaments per bundle, the filaments consisting essentially of a polyolefin, a polyolefin derivative, a polyester or a mixture of the foregoing and having a length of 1 to 30 mm, a mean transverse dimension of 5 to 30 μm and an aspect ratio of 100 to 1000, the filaments in each bundle being held together by a wetting agent, the wetting agent providing the individual filaments with a surface tension which allows them to become homogeneously dispersed in a concrete, mortar or paste with conventional mixing in conventional concrete mixing equipment, mixing the resulting mix for a period of at least about 20 seconds to obtain a concrete, mortar or paste mix in which the individual filaments are homogeneously distributed, and casting the concrete, mortar or paste mix in a configuration.

2. The method of claim 1 wherein the wetting agent is selected from the group consisting of fatty acid esters of glycerides, fatty acid amides, polyglycol esters, polyethoxylated amides, nonionic surfactants, cationic surfactants and blends of the above.

3. The method of claim 1 wherein a pre-cast concrete, mortar or cement mix to which the fibre bundles have been added are mixed in a paddle mixer for a period of at least about 30 seconds to obtain a concrete, mortar or paste mix in which the individual filaments are homogeneously distributed.

4. The method of claim 1 wherein an in situ concrete, mortar or cement mix to which the fibre bundles have been added is mixed in a drum mixer for a period of at least about 2 minutes to obtain a concrete, mortar or paste mix in which the individual filaments are homogeneously distributed.

5. The method of claim 1 wherein the synthetic fibre bundles are added in an amount of 0.05–0.5% by weight of the cementitious materials.

6. The method of claim 5 wherein the synthetic fibre bundles are added in an amount of 0.1–0.3% by weight of the cementitious materials.

7. The method of claim 6 wherein the synthetic fibre bundles are added in an amount of 0.15–0.25% by weight of the cementitious materials.

8. The method of claim 1 wherein the fibres are non-crimped.

9. The method of claim 1 wherein the individual filaments have a length of 3–30 mm.

10. The method of claim 9 wherein the individual filaments have a length of 6–18 mm.

11. The method of claim 1 wherein the individual filaments have a mean transverse dimension of 5–25 μm.

12. The method of claim 11 wherein the individual filaments have a mean transverse dimension of 10–20 μm.

13. The method of claim 1 wherein the fibres consist essentially of polypropylene.

14. The method of claim 1 wherein the filaments have an aspect ratio of 200–800.

15. The method of claim 14 wherein the filaments have an aspect ratio of 400–700.

16. Synthetic fibre bundles for the prevention of the formation of self-induced cracks in a cement material comprising 10–10,000 filaments per bundle, the filaments consisting essentially of a polyolefin, a polyolefin derivative, a polyester or a mixture of the foregoing and having a length of 1 to 30 mm, a mean transverse dimension of 5 to 30 μm and an aspect ratio of 100 to 1000, the filaments in each bundle being held together by a wetting agent, the wetting agent providing the individual filaments with a surface tension which allows them to become homogeneously dispersed in a concrete, mortar or paste with conventional mixing in conventional concrete mixing equipment.

17. Synthetic fibre bundles according to claim 16 wherein the wetting agent is selected from the group consisting of fatty acid esters of glycerides, fatty acid amides, polyglycol esters, polyethoxylated amides, nonionic surfactants, cationic surfactants and blends of the above.

18. Synthetic fibre bundles according to claim 16 wherein the fibres are non-crimped.

19. Synthetic fibre bundles according to claim 16 wherein the individual filaments have a length of 3–30 mm.

20. Synthetic fibre bundles according to claim 19 wherein the individual filaments have a length of 5–25 mm.

21. Synthetic fibre bundles according to claim 20 wherein the individual filaments have a length of 6–18 mm.

22. Synthetic fibre bundles according to claim 16 wherein the individual filaments have a mean transverse dimension of 5–25 μm.

23. Synthetic fibre bundles according to claim 22 wherein the individual filaments have a mean transverse dimension of 10–20 μm.

24. Synthetic fibre bundles according to claim 16 wherein the filaments have an aspect ratio of 200–800.

25. Synthetic fibre bundles according to claim 24 wherein the filaments have an aspect ratio of 400–700.

26. Synthetic fibre bundles according to claim 16 which consist essentially of polypropylene.

27. A method for the prevention of the development of self-induced cracking in a cement material, the method comprising adding to a concrete, mortar or cement mix to which water has been added, an amount of 0.05 to 1% by weight, based on the cementitious materials, of synthetic fibre bundles comprising 10–10,000 filaments per bundle, the filaments consisting essentially of a polyolefin, a polyolefin derivative, a polyester or a mixture of the foregoing and having a length of 1 to 30 mm, a mean transverse dimension of 5 to 30 μm and an aspect ratio of 100 to 1000, the filaments in each bundle being held together by a wetting agent, the wetting agent providing the individual filaments with a surface tension which allows them to become homogeneously dispersed in a concrete, mortar or paste with conventional mixing in conventional concrete mixing equipment.

28. A concrete, mortar or paste produced according to the method of claim 1.

29. A concrete, mortar or paste produced according to the method of claim 2.

30. A concrete, mortar or paste produced according to the method of claim 3.

31. A concrete, mortar or paste produced according to the method of claim 4.

32. A concrete, mortar or paste produced according to the method of claim 5.

33. A concrete, mortar or paste produced according to the method of claim 6.

34. A concrete, mortar or paste produced according to the method of claim 7.

35. A concrete, mortar or paste produced according to the method of claim 8.

36. A concrete, mortar or paste produced according to the method of claim 9.

37. A concrete, mortar or paste produced according to the method of claim 9.

38. A concrete, mortar or paste produced according to the method of claim 10.

39. A concrete, mortar or paste produced according to the method of claim 11.

40. A concrete, mortar or paste produced according to the method of claim 12.

41. A concrete, mortar or paste produced according to the method of claim 13.

42. A concrete, mortar or paste produced according to the method of claim 14.

43. A concrete, mortar or paste produced according to the method of claim 15.

* * * * *